United States Patent [19]

Koch

[11] 3,881,975
[45] May 6, 1975

[54] POLYAMIDE HOSE AND PREPARATION THEREOF

[75] Inventor: Robert B. Koch, Reading, Pa.

[73] Assignee: Rilsan Corporation, Glen Rock, N.J.

[22] Filed: Apr. 26, 1973

[21] Appl. No.: 354,301

[52] U.S. Cl. ............... 156/149; 138/125; 156/172; 156/244; 156/307
[51] Int. Cl. .......................... B32b 1/08; B32b 1/10
[58] Field of Search ........... 156/148, 149, 166, 172, 156/307, 244; 138/121, 123, 125, 129, 130, 144

[56] References Cited
UNITED STATES PATENTS

| | | | |
|---|---|---|---|
| 2,662,577 | 12/1953 | Gordon | 156/176 |
| 2,977,839 | 4/1961 | Koch | 156/149 |
| 3,002,534 | 10/1961 | Noland | 156/172 |
| 3,334,165 | 8/1967 | Koch | 156/149 |
| 3,335,042 | 8/1967 | Irwin | 156/307 |
| 3,437,537 | 4/1969 | Takada | 156/149 |
| 3,682,201 | 8/1972 | Atwell et al. | 156/149 |

*Primary Examiner*—Daniel J. Fritsch

[57] ABSTRACT

A polyamide hose is provided including a process for the process for the preparation thereof. In the process, a polyamide tubing is contacted with a solution of an organic material possessing specified characteristics and the treated tubing is then reinforced with at least one layer of a synthetic or natural fiber followed by subjecting the reinforced tubing to an elevated temperature of at least about 150° F.

25 Claims, No Drawings

POLYAMIDE HOSE AND PREPARATION THEREOF

BACKGROUND OF THE INVENTION

Various procedures have been described in the literature for producing an all-nylon textile-reinforced plastic hose by plasticizing the surface of nylon tubing and then applying to the plasticized surface of the plastic hose, while plasticized, a braided nylon textile reinforcement. The reinforced tubing is then passed through a water bath so as to remove the plasticizing agent, the resulting material is then subjected to heat and this is followed by immediately extruding a nylon covering over the plasticized surface of the braided material. This procedure is disclosed in Koch U.S. Pat. No. 2,977,839.

Atwell U.S. Pat. No. 3,682,201 discloses a similar textile-reinforced all polymeric hose which is considered to be as good as the hose disclosed in the aforesaid Koch Patent. In said U.S. Pat. No. 3,682,201, the procedure used is very similar to that described in the Koch patent mentioned supra in that one or more circular knitted layers of a thermoplastic, such as, for example, nylon, textile reinforcing elements and the like, are disposed around a thermoplastic (e.g. nylon) innertube. The knitted layer adjacent the inner tube is fused to the outer surface of the tube at the inner face therebetween and the succeeding knitted layers are fused to one another. The fusion is preferably achieved by plasticizing the thermoplastic components to be bonded together by using a resorcinol-water solution or other agent capable of plasticizing the thermoplastic material of the components to be bonded together, maintaining the components in contact with one another and in a relatively immobilized position while they are so plasticized until fusion bonding takes place. The plasticizing agent is then removed, usually by use of a solvent and the plasticizing action is thereby stopped.

In the procedures described in both the Koch and Atwell et al patents, the solvation or plasticization of the tubing is required prior to the applying of the fiber. Thus, the nylon which is being solvated has a preference for resorcinol and consequently, there is a continually changing concentration of the solvating bath. As a result, it is extremely difficult to control the operation. Further, in the aforesaid prior procedures, the solvated surface is very pliable and is pushed up through the interstices of the fiber and this can cause serious deterioration of the fiber through excess solvation of the fiber especially when the fiber is nylon.

SUMMARY OF THE INVENTION

In accordance with the present invention, a method has been developed for preparing a hose construction wherein a polyamide or copolyamide tubing is treated with a solution of an organic material possessing specified characteristics, the treated tubing is then reinforced with a synthetic or natural fiber followed by subjecting the reinforced tubing to a temperature of at least about 150° F.

The resulting tubing is especially adapted for pressure service such as, for example, in hydraulic, pneumatic, refrigeration, air conditioning, and other similar applications.

In the present process, a crystalline organic material having specified characteristics is dissolved in a suitable solvating agent such as, water, acetone, alcohol, and the like, and then applied as a thin coating as, for example, by conventional procedures such as spraying or by immersion of the polyamide tubing in the solvating agent. A suitable reinforcing material which is either a synthetic or natural fiber is then wrapped, braided or helically wound around the tubing so treated. The reinforced structure is then subjected to an elevated temperature, that is, a temperature of at least about 150° F thereby causing solvation of the polyamide tubing to produce the desired product.

Suitable polyamide tubings include, for example, nylon 6, nylon 66, polyamides of ω-aminoundecanoic acid (nylon 11), nylon 12, and the like, including homopolymers, copolymers, terpolymers, mixtures of such substances; Nylon 11 tubing is considered to be one of the more suitable tubing materials because of its characteristics of greater toughness and extremely high resistance to flex fatigue, chemical resistance and other highly desirable properties.

The organic materials referred to herein and used in the process are characterized by a crystalline structure at ambient temperatures, a melting point between about 40° and 150° C and are capable of solvating the surface of the polyamides including homopolymers, copolymers, terpolymers and mixtures thereof. In addition, such organic materials are further characterized by the presence of an acidic hydrogen atom and a solubility of at least about 20% by weight, in a volatile solvent. The groups of such organic materials are as follows:

1. Monofunctional organic carboxylic acids having up to eight carbon atoms and polyfunctional organic carboxylic acids having up to 12 carbon atoms and illustratively:
   Oxalic acid
   Malonic acid
   Glutaric acid
   Benzoic acid
   Crotonic acid
   Mandelic acid
   Tartaric acid
   Naphthalene acetic acid
   Trichloroacetic acid
   Sebacic acid, adipic acid
   Dodecanedioic acid and
   Chlorinated derivatives thereof as well as mixtures of the aforesaid materials;

2. Monofunctional and polyfunctional acidic hydroxylcontaining aromatic compounds and illustratively:
   Catechol
   Hydroquinone
   α-Naphthol
   Naphtho resorcinol
   Lower-alkoxy phenols, the alkoxy group containing from one to four carbons and illustratively, p-methoxy phenol, p-ethoxy phenol, and the like
   3,5-xylenol
   p-chlorophenol and
   p-bromophenol 3. Non-carboxylic aromatic acids and illustratively
   Benzene sulfonic acid
   Naphthalene sulfonic acid and
   o,m,p-toluene sulfonic acid and 4. Mixtures of the aforesaid substances.

Included within the mixtures of the aforesaid materials there can also be included the polyfunctional hydroxyl-containing aromatic compound that is, resorcinol.

It has been found that prior to contacting the polyamide tubing with the solution containing at least one of the aforesaid organic materials, said tubing should be desirably cleaned so as to prevent contamination of said resorcinol solution. Suitable cleaning agents include, for example, various alcohols such as methanol, ethanol, and the like.

In the present process, the selected organic material is dissolved in a suitable solvating agent such as, for example, water, acetone, a lower alkanol such as, for example, methanol, ethanol, and the like, or mixtures thereof. When said organic material is dissolved in an alcohol solution, as little as about 20% or as much as about 75% of the alcohol solution can be used and suitable, substantially equal amounts by weight, of the organic material and methanol. Another suitable solvating agent is a 25% aqueous and a 25% alcohol solution. It is desirable to add, to the solvating agent, a wetting agent such as Triton X-100 manufactured by E. I. DuPont or Tergitol, manufactured by the Union Carbide Corporation. However, such a wetting agent is unnecessary when an alcohol such as methanol or ethanol is used as the solvating agent.

The polyamide tubing such as, for example, the preferred nylon 11 and nylon 12 tubing is immersed and passed through a bath of the selected organic material or a mixture thereof, leaving on the tubing, a thin layer of the solvated organic material. The thin film which is developed on the surfaces of the tubing material can be dried and suitably, by a warm air blast at a temperature varying between about 75° and 120° F. when an alcohol is used as the solvating agent for the organic material, the drying time is considerably reduced and particularly, when methanol is used, because of its low boiling point, the methanol will evaporate rapidly. Consequently, methanol is deemed to be one of the more suitable solvating agents for the organic material. Following the drying step, a thin layer of the crystalline organic material is left on the surface of the polyamide tubing.

A reinforcing member is then applied to the polyamide tubing by conventional procedures such as, for example, by wrapping, braiding or helically winding said reinforcing member around the tubing. Suitable reinforcing materials include, for example, natural fibers such as cotton, or synthetic materials such as, for example, rayon, polyesters, that is, poly (ethylene terephthalate) such as "Dacron" (trademark) or "Terylene" (trademark); vinyl resins such as, for example, polyvinyl chloride or copolymers of vinyl chloride and vinyl acetate such as "vinyon;" acrylic plastics such as those which are largely based on acrylonitrile, and illustratively "Dynel" (trademark) "Orlon" (trademark), "Acrilan" (trademark) and "Creslan" (trademark); vinylidene chloride polymers and copolymers such as "Saran" (trademark); polyolefins such as polypropylene, and the like, as well as mixtures of the aforesaid natural and synthetic fibers. There can also be used, as reinforcing material, various polyamides such as nylon 6 (polyhexamethylene adipamide), nylon 11, nylon 12, nylon 66 (polymerized epsilon caprolactam), as well as copolymers, homopolymers and terpolymers of the aforesaid nylons, as well as mixtures thereof, and the like.

The resulting reinforced assembly is heated to an elevated temperature that is, to a temperature of about 150° F or higher thereby causing solvation of the polyamide tubing. When the reinforcing material is nylon, a chemical bond is created; where the reinforcing material is a fiber other than a nylon, an encapsulation is developed in the fiber resulting in excellent adherence to the polyamide or nylon tubing.

It has been found that a solution containing about 50% of the selected organic material or mixtures thereof, and 50% ethanol or methanol, by weight, will deposit a coating of about 1.5 mils (0.0015 inch) on the surface of the polyamide tubing. It has also been established that a solution of about 30 parts by weight methanol and about 40 parts by weight of the organic material produces a coating of the organic material on the tubing of about 2.0 mils (0.002 inch) thick.

Suitable organic materials used in the present process include, for example, naphthalene sulfonic acid, benzoic acid, oxalic acid, naphtho resorcinol, glutaric acid, xylenol, α-naphthol, catechol, methoxy phenol, and the like, as well as mixtures of these substances with resorcinol.

An alternative procedure that can be used in the present process involves passing a dry mixture of the polyamide such as, for example, nylon 11, and a selected crystalline organic material through an extruder whereby a thin film of the material covers the polyamide or nylon tubing. After this coating has solidified as, by cooling, the reinforcing material can be applied over the outside diameter of the coating and the resulting assembly is then passed through a heating chamber. This results in softening of the coating thereby allowing it to encapsulate the natural or synthetic fiber. The coating will also solvate the polyamide such as, for example, the nylon 11 inner core and produce a chemical bond. A suitable mixture of the organic material and a polyamide such as nylon 11, comprises about 50% of the organic material and 50% nylon, by weight.

The present process of bonding is far superior to the procedures described in the aforesaid U.S. Pat. Nos. 2,977,839 and 3,682,201. The prior art procedures require solvation or plasticization of the tubing prior to the application of the fiber. Consequently, the nylon which is being solvated has a preference for the organic material and there is a continually changing concentration of the solvating bath making it extremely difficult to control the process. However, the present process is characterized by the fact and distinguishable from the prior art procedures described above in that substantially no solvation occurs prior to the application of the natural or synthetic fiber to the polyamide tubing. Consequently, the concentration of the bath remains constant and as a result, there is deposited on the polyamide tubing a substantially uniform thickness of the organic material. Another advantage characterizing the present process is that the crystals of the organic material cannot be pushed up into the interstices of the natural or synthetic fiber when they are applied and this is unlike the prior art procedures wherein the solvated surface is very pliable and is pushed up through the interstices of the fibers. This causes, in some cases, serious deterioration of the fiber through excessive solvation of the fiber especially wne the fiber is nylon.

The following Examples illustrate the preferred techniques for preparing reinforced tubing. Unless otherwise specified, all parts and percentages are given by weight and all temperatures are in degrees Fahrenheit.

EXAMPLE I

Continuous nylon 11 tubing one-fourth inch (I.D.) and five-sixteenth inch (O.D.) is quickly passed through a methanol bath which is approximately 12 inches in length. The exposure time in the passage of the tubing through the bath is about 15 seconds. The nylon tubing is then immersed for a period of 6-7 seconds, in a bath 6 inches in length containing a solution of 50% by weight naphthalene sulfonic acid and 50% by weight methanol, at room temperature. The treated tubing is then withdrawn vertically from the bath thereby obtaining an even coverage of naphthalene sulfonic acid around the circumference of the tubing. The tubing is then subjected to warm air whereby a crystalline film of naphthalene sulfonic acid is deposited on the outside diameter of the tubing.

There is then applied to the dried tubing a synthetic fiber such as nylon 66 by use of a 24 Carrier Wardwell Braiding Machine using 2,400 denier film at 11 picks/inch to obtain a reinforced hosing material. An excellent bond is obtained.

The hose thus obtained had a burst strength of about 5,000 psi.

EXAMPLE II

The procedure of Example I was followed except that a rayon was applied to the nylon 11 tubing. An excellent bond is obtained.

The resulting hose had a burst strength of about 5,500 psi.

EXAMPLE III

Following the procedure of Example I except for the replacement of the nylon 11 tubing by a nylon 6, 66 copolymer (DuPont Zytel 91 [trademark]) and the use of benzoic acid instead of naphthalene sulfonic acid, a good bond was also obtained.

EXAMPLE IV

Following the procedure of Example I, except for the replacement of naphthalene sulfonic acid by naphtho resorinol, an excellent bond was obtained.

EXAMPLE V

The procedure of Example I was used except for the replacement of naphthalene sulfonic acid by xylenol. A very good bond was obtained.

EXAMPLE VI

Following the procedure of Example I except for the replacement of naphthalene sulfonic acid by glutaric acid, a good bond was obtained. A similar bond was also obtained by the use of the nylon 6, 66 copolymer.

EXAMPLE VII

Following the procedure of Example I except for the use of α-naphthol and using chlorophenol or bromophenol with the nylon 6, 66 copolymer, an excellent bond was obtained, in each of the aforesaid applications.

EXAMPLE VIII

Following the procedure of Example I except for the replacement of naphthalene sulfonic acid by catechol, a fair bond was obtained.

In applying the reinforcing material to the polyamide tubing, it may, at times, be desirable to apply more than one layer of the reinforcing material. This can be brought about by simply repeating the present procedure as described above. Specifically, the single layered reinforced tubing is contacted with a solution of the selected organic material or the organic material in particulate form to obtain a coating of the crystalline organic material thereon and this is followed by subjecting the reinforced tubing to an elevated temperature. Alternatively, a dry mixture of the polyamide and crystalline organic material is passed through an extruder thereby providing a thin film of said organic material on the reinforced tubing or hose. This is followed by the application of heat to the reinforced tubing.

It is possible and at times desirable to apply to the single layered or multi-layered reinforced tubing or hosing, a suitable covering material such as a polyamide or a neoprene rubber. Such a covering is applied by using the technique herein described that is, contacting the reinforced tubing with a solution of the organic material. Alternatively, the extrusion procedure described above can be used to obtain a polyamide tubing having a coating which is comprised of a mixture of the polyamide and organic material. There is then applied to the tubing obtained by either of the above procedures, a polyamide covering or a neoprene covering and then subjecting this assembly to heating at an elevated temperature that is, at temperatures in excess of about 150° F so as to bond the cover onto the single or multi-layered reinforced tubing.

I claim:

1. A process for the preparation of a reinforced hose construction which comprises contacting a polyamide or copolyamide tubing with a solution of a solid organic compound in a volatile solvent said organic compound being crystalline at ambient temperatures and being capable of solvating the surface of said polyamide or copolyamide having a solubility of at least about 20% by weight in said volatile solvent and a melting point between about 40° and 180° C, said organic compound also having an acidic hydrogen atom and being selected from the group consisting of 1. a mono or poly functional carboxylic acid, said mono-acid having up to eight carbon atoms and said poly functional acid having up to 12 carbon atoms, including halogenated derivatives thereof,
2. a mono or poly functional acidic hydroxyl-containing aromatic compound,
3. a non-carboxylic aromatic acid, and
4. mixtures of the aforesaid materials, including a mixture containing resorcinol, forming crystals of said organic compound on said tubing by drying said volatile solvent, reinforcing said tubing with at least one layer of a synthetic or natural fiber and then subjecting the reinforced tubing thus obtained to a temperature of at least about 150° F.

2. A process according to claim 1 wherein the aforesaid carboxylic acids are selected from the group consisting of oxalic acid
malonic acid
glutaric acid
benzoic acid
crotonic acid
mandelic acid
tartaric acid naphthalene acetic acid
trichloroacetic acid
sebacic acid, adipic acid
dodecanedioic acid and
mixtures thereof, including halogenated derivatives thereof.

3. A process according to claim 2 wherein the carboxylic acid is benzoic acid or oxalic acid.

4. A process according to claim 1 wherein the hydroxyl-containing aromatic compound is selected from the group consisting of
catechol
hydroquinone
α-naphthol
naphtho-resorcinol
a lower alkoxy phenol, said alkoxy group containing from one to four carbon atoms,
3,5-xylenol
p-chlorophenol and
p-bromophenol
including mixtures thereof and also including mixtures of resorcinol with the aforesaid substances.

5. A process according to claim 4 wherein the aforesaid hydroxy-containing aromatic compound is naphtho resorcinol or α-naphthol.

6. A process according to claim 1 wherein the noncarboxylic aromatic acid is selected from the group consisting of benzene sulfonic acid, naphthalene sulfonic acid or o-, m- or p-toluene sulfonic acid.

7. A process according to claim 6 wherein said noncarboxylic acid is naphthalene sulfonic acid.

8. A process according to claim 1 wherein the aforesaid solution is an aqueous or an alcoholic solution.

9. A process according to claim 8 wherein the alcoholic solution is an alkanol containing from one to four carbon atoms.

10. A process according to claim 9 wherein the alcohol is methanol or ethanol in an amount equal to about 50% by weight of the solution.

11. A process according to claim 8 wherein the tubing treated with said solution is dried.

12. A process according to claim 1 wherein the polyamide is a member selected from the group consisting of nylon 6, nylon 11, nylon 12, nylon 66 and copolymers thereof.

13. A process according to claim 12 wherein the polyamide is nylon 11 or nylon 12.

14. A process according to claim 1 wherein the natural fiber is cotton and the synthetic fiber is selected from the group consisting of nylon 6, nylon 66, a poly (ethylene terephthalate) and rayon.

15. A process according to claim 1 wherein the polyamide or copolyamide tubing is treated with an alkanol containing from 1 to 4 carbon atoms prior to contacting with a solution containing a member selected from the group consisting of naphthalene sulfonic acid, benzoic acid, oxalic acid, glutaric acid and mixtures thereof including mixtures containing resorcinol.

16. A process according to claim 1 wherein the reinforced product thus obtained is contacted with a solution or a particulate form of a member selected from the group consisting of naphthalene sulfonic acid, benzoic acid, oxalic acid, glutaric acid and mixtures thereof including mixtures containing resorcinol, followed by applying at least one additional coating of a synthetic or natural fiber reinforcing material and then subjecting the resulting assembly to a temperature of at least about 150° F.

17. A process according to claim 16 wherein said additional layer is applied to said reinforced product by wrapping, braiding or helically winding said layer around or on said reinforced product.

18. A process according to claim 1 which comprises contacting the single or multi-layered reinforced tubing with a solution or a particulate form of naphthalene sulfonic acid, benzoic acid, oxalic acid, glutaric acid, and mixtures thereof including mixtures with resorcinol,
applying thereon a covering selected from the group consisting of a polyamide, copolyamide or neoprene followed by heating the resulting assembly at a temperature in excess of about 150° F.

19. A process according to claim 18 wherein said additional layer is applied to said reinforced product by wrapping, braiding or helically winding said layer around or on said reinforced product.

20. A process according to claim 1 wherein the layer of said synthetic or natural fiber is applied to said tubing by wrapping, braiding or helically winding the aforesaid fiber on or around said tubing.

21. A process for preparing a reinforced hose which comprises providing a mixture of a polyamide or copolyamide and an organic compound selected from the group consisting of naphthalene sulfonic acid, benzoic acid, oxalic acid, glutaric acid and mixtures thereof including mixtures containing resorcinol, extruding said mixture to cover a polyamide or copolyamide tubing with a thin coating of said mixture, reinforcing said coated tubing with at least one layer of a synthetic or natural fiber and then subjecting the resulting assembly to a temperature of at least about 150° F.

22. A process according to claim 21 wherein the reinforced product thus obtained is contacted with a coating comprising an extruded product of a polyamide or copolyamide and a solution or a particulate form of naphthalene sulfonic acid, benzoic acid, oxalic acid, glutaric acid, and mixtures thereof including mixtures with resorcinol, followed by applying thereon at least one additional layer of a synthetic or natural fiber reinforcing material and then subjecting the resulting assembly to a temperature of at least about 150° F.

23. A process according to claim 22 wherein said additional layer is applied to said reinforced product by wrapping, braiding or helically winding said layer around or on said reinforced product.

24. A process according to claim 21 which comprises contacting a single or multi-layered reinforced tubing with a coating comprising an extruded product of a polyamide or a copolyamide and a solution or a particulate form of naphthalene sulfonic acid, benzoic acid, oxalic acid, glutaric acid and mixtures thereof, including mixtures with resorcinol,
applying a covering selected from the group consisting of a polyamide, copolyamide and a neoprene onto said reinforced tubing followed by heating the resulting assembly at a temperature in excess of about 150° F.

25. A process according to claim 24 wherein said additional layer is applied to said reinforced product by wrapping, braiding or helically winding said layer around or on said reinforced product.

* * * * *